(12) United States Patent
Jania et al.

(10) Patent No.: US 9,483,750 B2
(45) Date of Patent: Nov. 1, 2016

(54) LOCATION INDEPENDENT COMMUNICATION IN A VIRTUAL WORLD

(75) Inventors: Frank L. Jania, Chapel Hill, NC (US); Ruthie D. Lyle, Durham, NC (US)

(73) Assignee: International Business Machines Corporation, Armonk, NY (US)

(*) Notice: Subject to any disclaimer, the term of this patent is extended or adjusted under 35 U.S.C. 154(b) by 1531 days.

(21) Appl. No.: 11/967,662

(22) Filed: Dec. 31, 2007

(65) Prior Publication Data
US 2009/0172574 A1   Jul. 2, 2009

(51) Int. Cl.
*G06F 3/048* (2013.01)
*G06Q 10/10* (2012.01)

(52) U.S. Cl.
CPC ....... *G06Q 10/10* (2013.01); *A63F 2300/5553* (2013.01); *A63F 2300/572* (2013.01)

(58) Field of Classification Search
CPC ..................................................... G06F 3/048
USPC .................................................. 715/757, 764
See application file for complete search history.

(56) References Cited

U.S. PATENT DOCUMENTS

| | | |
|---|---|---|
| 6,476,830 B1 | 11/2002 | Farmer et al. |
| 6,734,885 B1 | 5/2004 | Matsuda |
| 6,912,565 B1 | 6/2005 | Powers et al. |
| 2006/0123351 A1 | 6/2006 | Littlefield |
| 2006/0258462 A1* | 11/2006 | Cheng et al. .................. 463/42 |
| 2008/0167878 A1* | 7/2008 | Hause et al. .................. 704/270 |
| 2008/0215679 A1* | 9/2008 | Gillo et al. .................... 709/204 |
| 2009/0128555 A1* | 5/2009 | Benman ........................ 345/419 |
| 2009/0150418 A1* | 6/2009 | Shuster ......................... 707/100 |

OTHER PUBLICATIONS

Farooq, Umer, et al; Avatar Proxies: Configurable Informants of Collaborative Activities; Conference on Human Factors inComputing Systems pp. 792-793; 2003.

Zhang, Xiaolong, et al; Social Interactions in Multiscale CVEs; Proceedings of the 4th International Conference on Collaborative Environments; pp. 31-38; 2002.

Jaynes, C. et al; The Metaverse—A Networked Collection of Inexpensive, Self-Configuring, Immersive Environments; Proceedings of the Workshop on Virtual Environments; pp. 115-124; 2003.

* cited by examiner

*Primary Examiner* — Andrea Leggett
(74) *Attorney, Agent, or Firm* — Steven M. Greenberg, Esq.; CRGO Law

(57) ABSTRACT

Embodiments of the present invention address deficiencies of the art in respect to virtual worlds and provide a method, system and computer program product for deploying and managing an avatar silhouette in a location in a virtual world. In one embodiment of the invention, a method for deploying and managing an avatar silhouette in a location in a virtual world can include creating and inserting a silhouette avatar into one location of a virtual world in correspondence with a primary avatar in a different location in the virtual world, rendering the silhouette avatar recognizable by an avatar in the one location and prohibiting independent movements by the silhouette avatar, and passing a communication directed from the avatar in the one location to the silhouette avatar in the one location along to the primary avatar in the different location.

15 Claims, 1 Drawing Sheet

LOCATION INDEPENDENT COMMUNICATION IN A VIRTUAL WORLD

BACKGROUND OF THE INVENTION

1. Field of the Invention

The present invention relates to virtual reality and more particularly to virtual world management over a computer communications network.

2. Description of the Related Art

As the progenitor to the modern virtual world, the multi-user dungeon provided a revolutionary experience for its first participants more than three decades ago. The multi-user dungeon was and continues to be a multi-player computer game that combines elements of role-playing, first person shooter and social chat. The multi-user dungeon generally executes in a central server configured for simultaneous access by participants over a global computer communications network like the Internet. The multi-user dungeon historically has been text-driven where the immediate environment is presented to participants in text form, and participants engage in actions in the environment through textual directives mimicking the postings of an instant messenger. Non-player characters in the multi-user dungeon can be automated and the actions of the non-player characters can be broadcast to the participants also as textual postings.

Like a multi-user dungeon, virtual reality allows a user to interact with a computer-simulated environment; however in virtual reality, the virtual environment is visual in nature and can be displayed either on a computer screen or through customized or stereoscopic displays. Advanced modes of virtual reality further incorporate other sensory presentation elements, including audio elements and tactile elements. Generally, end-users interact with a virtual reality environment through traditional keyboard and mouse movements, though other input means are provided occasionally including gyroscopic handheld devices and gloves, and joysticks. Consistent throughout all virtual reality experiences, the virtual reality environment reflects the real world environment and has proven invaluable in commercial applications such as flight simulation or combat training.

The virtual world builds upon the multi-user dungeon and virtual reality in order to provide a computer-based simulated environment in which participants interact with one another through three-dimensional visually displayable surrogates referred to as avatars. In this regard, participants "inhabit" the virtual world through their respective avatars. In as much as avatars can freely roam the bounds of the virtual world, virtual worlds expand the boundaries of the multi-user dungeon and permit participants to truly enjoy freedom of motion and exploration within the virtual world. To date, virtual worlds have become such close approximations to reality that the lines of reality have become blurred to the extent that many participants treat ordinary interactions in the virtual world with the same degree of seriousness as those same interactions in the real world.

Avatars for users in a virtual world can maintain an awareness of each other's presence when the avatars are both present in a same location in the virtual world. Flexibly, if an avatar is marked as a "friend" of another avatar, both avatars will be visible to one another irrespective of whether or not the avatars are in the same location in the virtual world. Yet, all other avatars will remain unnoticed by each other so long as the other avatars are in disparate locations in the virtual world.

BRIEF SUMMARY OF THE INVENTION

Embodiments of the present invention address deficiencies of the art in respect to virtual worlds and provide a novel and non-obvious method, system and computer program product for deploying and managing an avatar silhouette in a location in a virtual world. In one embodiment of the invention, a method for deploying and managing an avatar silhouette in a location in a virtual world can include creating and inserting a silhouette avatar into one location of a virtual world in correspondence with a primary avatar in a different location in the virtual world, rendering the silhouette avatar recognizable by an avatar in the one location and prohibiting independent movements by the silhouette avatar, and passing a communication directed from the avatar in the one location to the silhouette avatar in the one location along to the primary avatar in the different location.

In one aspect of the embodiment, the method further can include attaching the silhouette avatar to another avatar in the one location, and shadowing movements performed by the attached another avatar with corresponding movements of the silhouette avatar. In another aspect of the embodiment, the method further can include limiting the shadowed movements to locations permitted for visiting by the primary avatar. In yet another aspect of the embodiment, the method further can include rendering a view experienced by the silhouette avatar in the one location in a view for the primary avatar in the different location. Finally, in even yet another aspect of the embodiment, the method further can include rendering a mapping of a location of all silhouette avatars corresponding to the primary avatar in a view for the primary avatar in the different location.

In another embodiment of the invention, a virtual world data processing system can be provided. The system can include a virtual world executing in a host server. The virtual world can include locations, avatars and objects. The system also can include silhouette avatar management logic. The logic can include program code enabled to create and insert a silhouette avatar into one of the locations of the virtual world in communicative correspondence with a primary avatar in a different one of the locations in the virtual world, and further to allow other avatars in the one location to recognize and communicate with the primary avatar through the silhouette avatar. Optionally, the program code of the logic can be enabled to pass along a view experienced by the silhouette avatar to the primary avatar as if the primary avatar were present in the one location. Yet further, the program code of the logic can be enabled to manage an attachment of the silhouette avatar to another avatar in the one location so as to move within the one location in coordination with and at the behest of the attached avatar.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for deploying and managing an avatar silhouette in a location in a virtual world. In accordance with an embodiment of the present invention, a silhouette avatar can be created in one location of a virtual world in communicative correspondence with a primary avatar in a different location in the virtual world. Thereafter, other avatars in the one location can recognized and communicate with the primary avatar through the silhouette avatar. Further, a view experienced by the silhouette avatar can be passed along to the primary avatar as if the primary avatar were present in the one location. Finally, the silhouette avatar can be attached to another avatar in the one location so as to move within the one location in coordination with and at the behest of the attached avatar.

Figure 1:
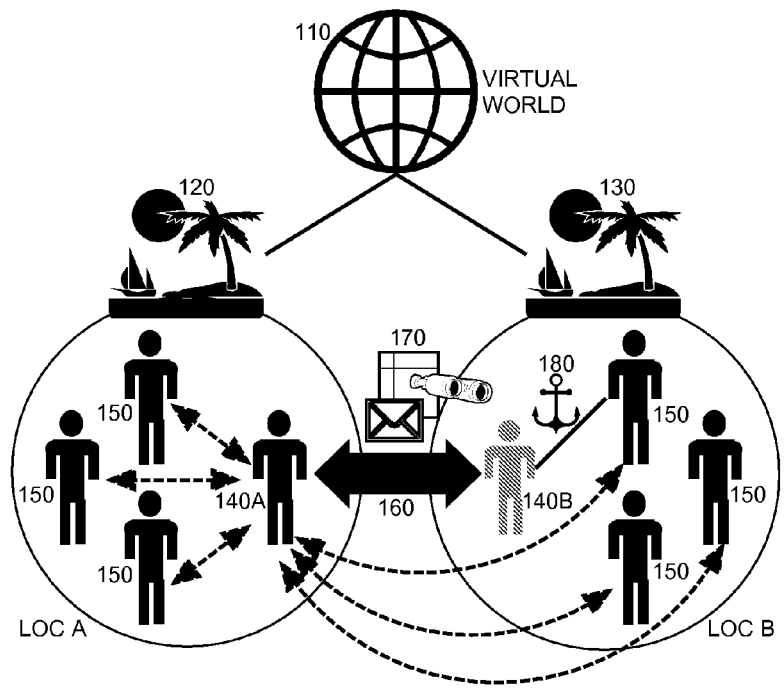
FIG. 1 is a pictorial illustration of a process for deploying and managing an avatar silhouette in a location in a virtual world.

In further illustration, FIG. 1 is a pictorial illustration of a process for deploying and managing an avatar silhouette in a location in a virtual world. As shown in FIG. 1, a virtual world 110 can be established to include multiple different locations 120, 130 (only two locations shown for the purpose of illustrative simplicity). Each of the locations 120, 130 can include different avatars 150 representative of different virtual personas for different end users participating in the virtual world 110. For given avatar 140A in a first location 120, a silhouette 140B of the avatar 140A can be inserted into a second location 130 separate from the first location 120.

The silhouette 140B can include a one-to-one communicative linkage with the avatar 140B so as to act as a communicative proxy for the avatar 140A in the second location 130 though the avatar 140A is not present in the second location 130. In this regard, the silhouette 140B can appear as a proxy for the avatar 140A to other avatars 150 in the second location 130 such that the other avatars 150 can transmit messages through the silhouette 140B to the avatar 140A. The appearance can include, for instance, a grayed out appearance or a transparent appearance, for example. Further, the silhouette 140B can provide location data 170 for the second location 130 to the avatar 140A as if the avatar 140A were present in the second location 130, including a visual view from the perspective of the silhouette 140B and other environmental data pertaining to the second location 130.

Notably, as the silhouette 140B is merely a proxy presence of the avatar 140A in the second location 130, the silhouette 140B can be limited in its actions in the second location 130. In particular, the silhouette 140B cannot engage in independent motions such as independently walking, gesturing and teleporting. However, an attachment 180 can be established between the silhouette 140B and other avatars 150 in the second location 130. In this way, the independent motions of the attached one of the avatars 150 can be translated into dependent motions performed on the part of the silhouette 140B. Thus, the silhouette 140B literally can shadow the movements of the attached one of the avatars 150 in the second location 130.

In respect to attaching the silhouette 140B to another one of the avatars 150 in the second location, the resulting movements of the silhouette 140B can be limited by one or more rules. For example, a silhouette 140B can engage an attachment 180 only to other avatars 150 in the second location 130 within a certain physical distance. As another example, the attachment 180 for the silhouette 140B can have a limited duration of time. As yet another example, the silhouette 140B cannot teleport to a location not permitted for the avatar 140A corresponding to the silhouette 140B. However, as an option temporary permission can be provided so long as the silhouette 140B remains attached. To the extent that the rules prohibit a particular movement of the silhouette 140B, the silhouette 140B and hence the corresponding avatar 140A can be notified and the attachment 180 can be removed.

Finally, so as to provide a degree of awareness of the movements of the silhouette 140B and its respective environment in the second location 130, environmental data 170 including a view to the second location 130 from the perspective of the silhouette 140B. The environmental data 170 can be used to provide a mapping of the silhouette 140B for the end user associated with the corresponding avatar 140A. Yet further, the mapping can include not only the location of the silhouette 140B in the second location 130, but also the locations of all other silhouettes (not shown) corresponding to the avatar 140A in other locations (not shown) for the virtual world 110. The mapping can be interactive such that the end user can select a location of the silhouette 140B on the mapping in response to which a display can be provided of the view experienced by the silhouette 140B in the second location 130, information pertaining to the silhouette 140B in the second location 130 such as the attachment 180, or both.

Figure 2:
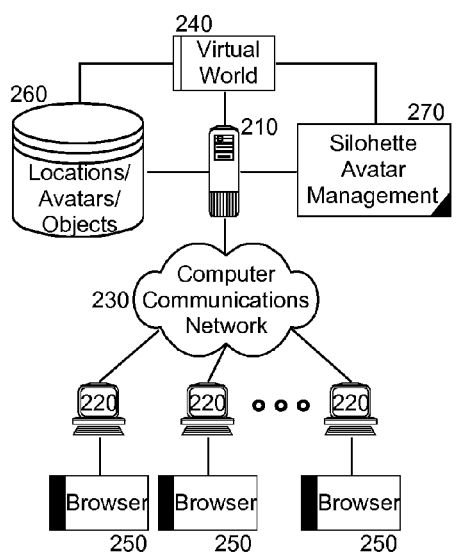
FIG. 2 is a schematic illustration of a virtual world data processing system configured to deploy and manage avatar silhouettes in different locations of the virtual world; and, FIG. 3 is a flow chart illustrating a process for deploying and managing an avatar silhouette in a location in a virtual world.

The process shown in FIG. 1 can be implemented in a virtual world data processing system. In illustration, FIG. 2 schematically depicts a virtual world data processing system configured to deploy and manage avatar silhouettes in different locations of the virtual world. The system can include a host server 210 configured for communicative coupling to multiple different clients 220 over computer communications network 230. The host server 210 can support the operation of a virtual world 240 coupled to a data store 260 storing the locations, avatars and objects of the virtual world 240. End users can interact with the locations, avatars and objects of the virtual world 240 through respective browsers 250 in corresponding ones of the clients 220.

Notably, silhouette avatar management logic 270 can be coupled to the virtual world 240 through the host server 210. The silhouette avatar management logic 270 can include program code enabled to create and insert a silhouette avatar into one location of a virtual world 240 in communicative correspondence with a primary avatar in a different location in the virtual world 240. The program code of the logic 270 further can be enabled to allow other avatars in the one location to recognize and communicate with the primary avatar through the silhouette avatar. Further, the program code of the logic 270 can be enabled to pass along a view experienced by the silhouette avatar to the primary avatar as if the primary avatar were present in the one location.

Finally, the program code of the logic 270 can be enabled to manage the attachment of the silhouette avatar to another avatar in the one location so as to move within the one location in coordination with and at the behest of the attached avatar.

Figure 3:
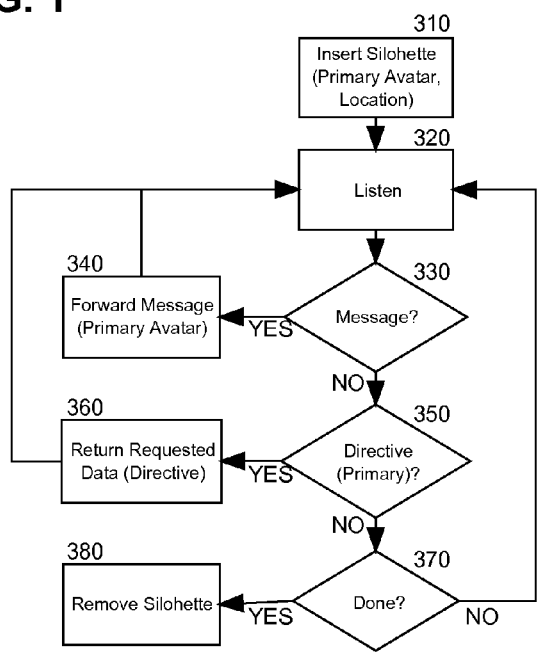

In illustration of the operation of the silhouette management logic 270, FIG. 3 is a flow chart illustrating a process for deploying and managing an avatar silhouette in a location in a virtual world. Beginning in block 310 a silhouette avatar can be inserted into a first location in connection with a primary avatar in a different location of the virtual world. In block 320, the silhouette avatar can listen for interactions with the silhouette avatar which can range from directives associated with the primary avatar, to communications provided by other avatars in the first location of the virtual world. In decision block 330, if a detected interaction is a message from another avatar in the first location, in block 340 the message can be forwarded to the primary avatar in the second location.

In decision block 330, if the detected interaction is not a message from another avatar, in decision block 350 it can be determined whether or not the interaction is a directive from the primary avatar in the second location. If so, in block 360 a response to the directive can be returned to the primary avatar. In this regard, the response can include a requested view of the first location experienced by the silhouette avatar, data pertaining to the environment of the silhouette avatar such as a location in the first location, or data pertaining to an attachment between the silhouette avatar and another avatar in the first location. In decision block 350, if it is determined that the interaction is not a directive from the primary avatar in the second location, in decision block 370 it can be determined whether or not the silhouette avatar is to be removed from the first location. If so, in block 380 the silhouette avatar can be removed from the first location. Otherwise, the process can return to block 320.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for deploying and managing an avatar silhouette in a location in a virtual world, the method comprising:
   creating and inserting a silhouette avatar into one location of a virtual world and attaching the silhouette avatar to a primary avatar in a different location in the virtual world;
   rendering the silhouette avatar recognizable by an avatar in the one location, the silhouette avatar being incapable of movement in the one location that differs from movement of the primary avatar in the different location;
   passing a communication directed from the avatar in the one location to the silhouette avatar in the one location along to the primary avatar in the different location; and,
   detecting a movement of the primary avatar that is prohibited by one or more rules for movement of the silhouette avatar and in response to the detected movement, detaching the silhouette avatar from the primary avatar.

2. The method of claim 1, wherein rendering the silhouette avatar recognizable by an avatar in the one location, comprises distinguishing an appearance of the silhouette avatar from other avatars in the one location.

3. The method of claim 1, further comprising:
   attaching the silhouette avatar to another avatar in the one location; and,
   shadowing movements performed by the attached another avatar with corresponding movements of the silhouette avatar.

4. The method of claim 3, further comprising limiting the shadowed movements to locations permitted for visiting by the primary avatar.

5. The method of claim 1, further comprising rendering a view experienced by the silhouette avatar in the one location in a view for the primary avatar in the different location.

6. The method of claim 1, further comprising rendering a mapping of a location of all silhouette avatars corresponding to the primary avatar in a view for the primary avatar in the different location.

7. A virtual world data processing system comprising:
   a processor;
   a virtual world executing in a host server, the virtual world comprising a plurality of locations, avatars and objects; and,
   silhouette avatar management logic comprising program code enabled to create and insert a silhouette avatar into one of the locations of the virtual world and to attach the silhouette avatar to a primary avatar in a different one of the locations in the virtual world, the silhouette avatar being incapable of movement in the one of the locations that differs from movement of the primary avatar in the different one of the locations and further to allow other avatars in the one location to recognize and communicate with the primary avatar through the silhouette avatar and to detect a movement of the primary avatar that is prohibited by one or more rules for movement of the silhouette avatar and in response to the detected movement, detaching the silhouette avatar from the primary avatar.

8. The system of claim 7, wherein the program code of the logic is further enabled to pass along a view experienced by the silhouette avatar to the primary avatar as if the primary avatar were present in the one location.

9. The system of claim 7, wherein the program code of the logic is further enabled to manage an attachment of the silhouette avatar to another avatar in the one location so as to move within the one location in coordination with and at the behest of the attached avatar.

10. A computer program product comprising a non-transitory computer usable storage medium storing computer usable program code for deploying and managing an avatar silhouette in a location in a virtual world, the computer program product comprising:

computer usable program code for creating and inserting a silhouette avatar into one location of a virtual world and attaching the silhouette avatar to a primary avatar in a different location in the virtual world;

computer usable program code for rendering the silhouette avatar recognizable by an avatar in the one location, the silhouette avatar being incapable of movement in the one location that differs from movement of the primary avatar in the different location;

computer usable program code for passing a communication directed from the avatar in the one location to the silhouette avatar in the one location along to the primary avatar in the different location; and, computer usable program code for detecting a movement of the primary avatar that is prohibited by one or more rules for movement of the silhouette avatar and in response to the detected movement, detaching the silhouette avatar from the primary avatar.

11. The computer program product of claim 10, wherein the computer usable program code for rendering the silhouette avatar recognizable by an avatar in the one location, comprises computer usable program code for distinguishing an appearance of the silhouette avatar from other avatars in the one location.

12. The computer program product of claim 10, further comprising:

computer usable program code for attaching the silhouette avatar to another avatar in the one location; and, computer usable program code for shadowing movements performed by the attached another avatar with corresponding movements of the silhouette avatar.

13. The computer program product of claim 12, further comprising computer usable program code for limiting the shadowed movements to locations permitted for visiting by the primary avatar.

14. The computer program product of claim 10, further comprising computer usable program code for rendering a view experienced by the silhouette avatar in the one location in a view for the primary avatar in the different location.

15. The computer program product of claim 10, further comprising computer usable program code for rendering a mapping of a location of all silhouette avatars corresponding to the primary avatar in a view for the primary avatar in the different location.

* * * * *